No. 759,868. PATENTED MAY 17, 1904.
A. A. EICH.
WEDGE.
APPLICATION FILED JAN. 26, 1904.
NO MODEL.

Witnesses
E. F. Stewart
S. A. Acker

Albert A. Eich, Inventor.
by C. A. Snow & Co.
Attorneys

THE NORRIS PETERS CO., PHOTO-LITHO., WASHINGTON, D. C.

No. 759,868. Patented May 17, 1904.

UNITED STATES PATENT OFFICE.

ALBERT A. EICH, OF NEW MUNICH, MINNESOTA.

WEDGE.

SPECIFICATION forming part of Letters Patent No. 759,868, dated May 17, 1904.

Application filed January 26, 1904. Serial No. 190,660. (No model.)

*To all whom it may concern:*

Be it known that I, ALBERT A. EICH, a citizen of the United States, residing at New Munich, in the county of Stearns and State of Minnesota, have invented a new and useful Wedge, of which the following is a specification.

This invention relates to wedges, and more particularly to that class of wedges designed for use by lumbermen and others for felling and splitting timber.

The object of the invention is to provide a simple, inexpensive, and durable device of this character capable of being readily driven in frozen or other timber without the liability of the wedge being forcibly ejected therefrom when struck with an ax or other tool.

A further object of the invention is to provide a wedge having its side faces grooved or recessed, defining oppositely-disposed retaining-ribs which enter the kerf or split in the timber and become embedded in the wood sufficiently to retain the wedge in position, and thereby prevent accidental displacement of the same.

The invention consists in the construction and novel combination and arrangements of parts hereinafter fully described, illustrated in the accompanying drawings, and pointed out in the claims hereto appended, it being understood that various changes in form, proportion, and minor details of construction may be resorted to without departing from the principle or sacrificing any of the advantages of this invention.

Figure 1:
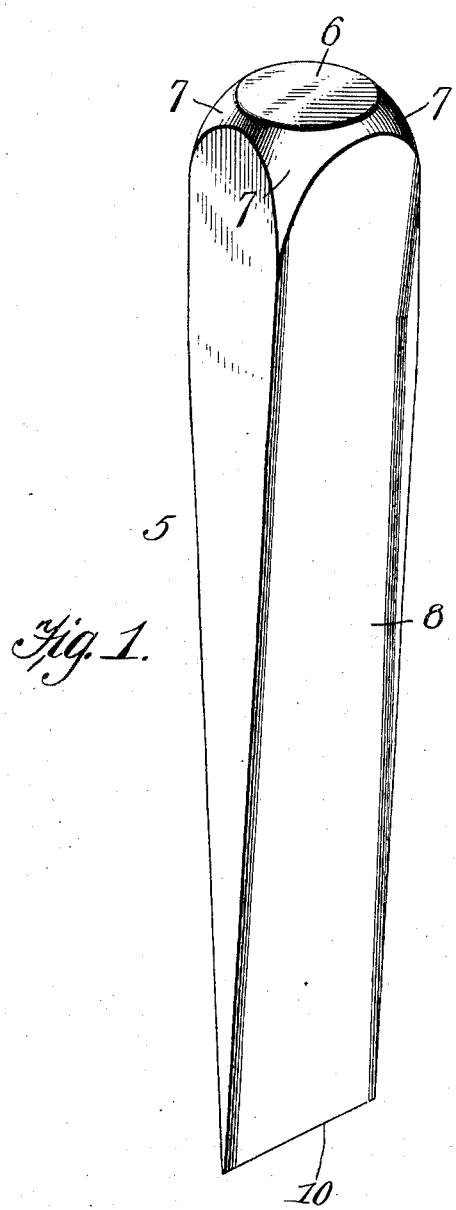
Figure 2:
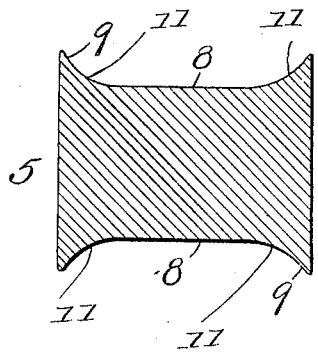
Figure 3:
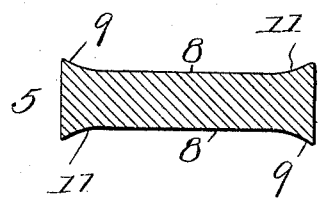

In the accompanying drawings, forming a part of this specification, Figure 1 is a perspective view of a wedge constructed in accordance with my invention. Fig. 2 is a transverse sectional view of the same, and Fig. 3 is a similar view.

Similar numerals of reference indicate corresponding parts in all the figures of the drawings.

The wedge 5, which may be formed of metal or other suitable material, is provided with a flat head 6, the sides of which are beveled or rounded, as indicated at 7, to thereby prevent said head from expanding and the corners or edges thereof being broken when struck by an ax, mallet, or other tool.

The side faces of the wedge are recessed longitudinally, as shown at 8, defining oppositely-disposed parallel ribs or flanges 9, which enter the kerf or split in the timber and embed themselves in the wood sufficiently to retain the wedge in position and prevent the same from being accidentally displaced when driving said wedge.

The ribs or flanges 9 preferably extend the entire length of the wedge and gradually diminish in thickness from a point adjacent the head 6 to the point or entering edge 10, that portion of the wedge between the concaved side faces 11 of the ribs being substantially flat, as shown, so as to present a smooth plane surface to the wood, and thereby prevent the wedge from twisting.

The ribs or flanges 9 serve to guide and retain the wedge within the kerf or split in the timber, while the concave or rounded side faces of said ribs serve to strengthen the latter and prevent injury to the hands in handling the wedge.

Having thus described the invention, what is claimed is—

1. A wedge having recessed side faces defining oppositely-disposed parallel retaining-ribs, said ribs gradually diminishing in thickness from a point adjacent the head of the wedge to the entering edge thereof.

2. A wedge provided with a flat head and having its opposite side faces recessed to form parallel retaining-ribs, the corners of the wedge adjacent to the head being beveled or rounded.

In testimony that I claim the foregoing as my own I have hereto affixed my signature in the presence of two witnesses.

ALBERT A. EICH.

Witnesses:
ANDREW ZEIS,
SIMON GRATECK.